May 27, 1924.
W. McNAMES
1,495,915
ANTISKID DEVICE FOR AUTOMOBILES
Filed May 9, 1921
2 Sheets-Sheet 1
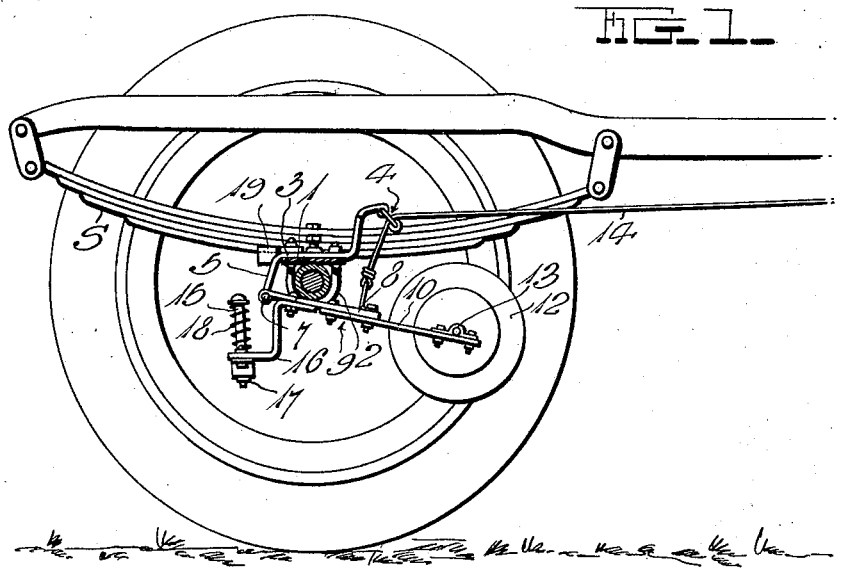
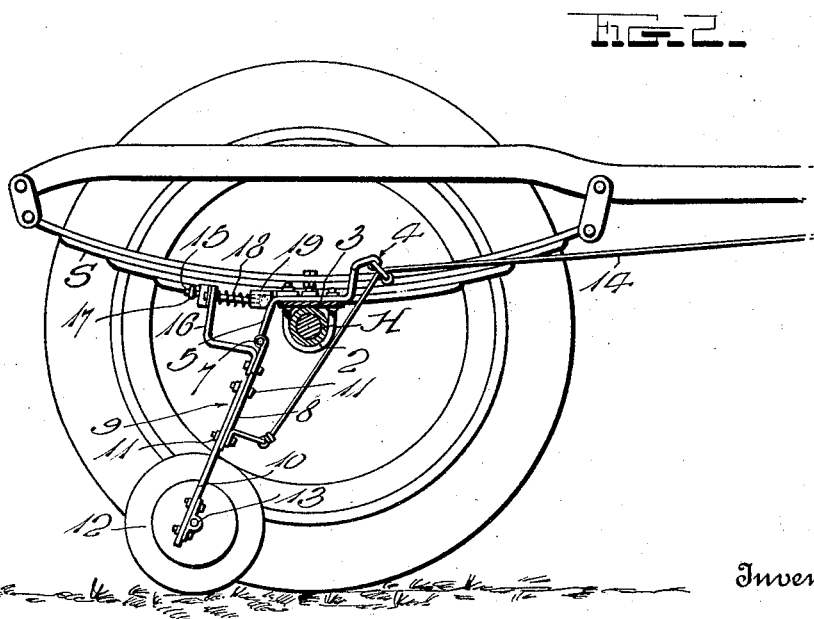
Witness
H. Woodard
Inventor
W. McNames
By H. B. Wilson & Co.
Attorneys

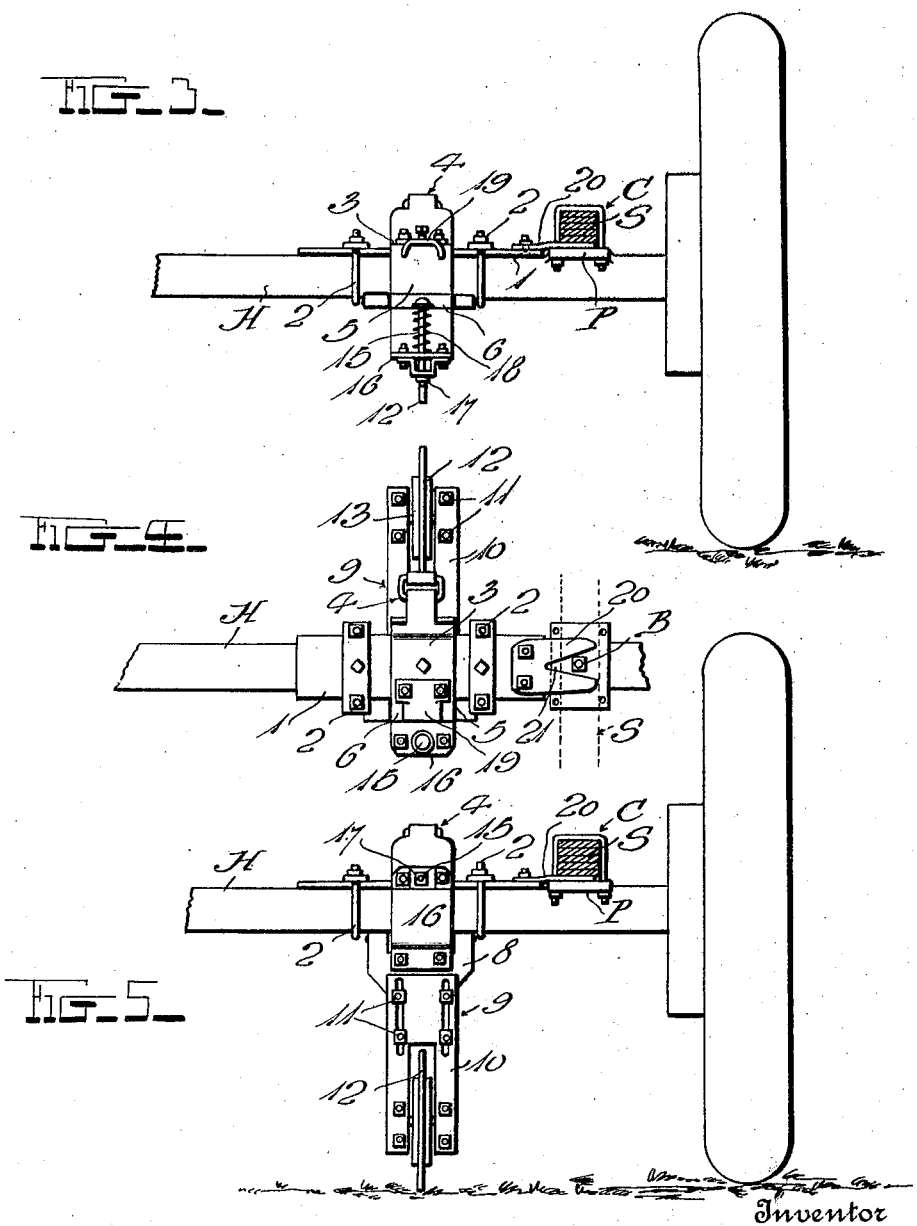

Patented May 27, 1924.

1,495,915

UNITED STATES PATENT OFFICE.

WILLIAM McNAMES, OF ABERDEEN, SOUTH DAKOTA.

ANTISKID DEVICE FOR AUTOMOBILES.

Application filed May 9, 1921. Serial No. 467,979.

*To all whom it may concern:*

Be it known that I, WILLIAM McNAMES, a citizen of the United States, residing at Aberdeen, in the county of Brown and State of South Dakota, have invented certain new and useful Improvements in Antiskid Devices for Automobiles; and I do declare the following to be a full, clear, and exact description of the invention, such as will enable others skilled in the art to which it appertains to make and use the same.

This invention relates to an improved anti-skid device which is especially, although, not necessarily designed for application on automobiles, the same being designed, as is obvious, to prevent skidding and side swerving of the rear end of the machine, yet not interfering with the forward travel of the latter.

The principal object of the invention is to provide an anti-skid device of this class which is an improvement on similar patented and marketed devices for the same purpose, the same embodying a ground-engaging pivotally mounted member which is normally suspended in a horizontal position in advance of the rear axle, this member being so mounted that when released and permitted to move to operative position, it moves beneath and in rear of said axle, and momentarily becomes embedded in the ground when in a true vertical position beneath the axle, thus immediately checking any side skidding of the machine.

Another object of the invention is to provide an anti-skidding device of this class which embodies a novel pivotally mounted ground-engaging member and attaching means, together with spring means arranged between the two for limiting the rearward movement of the ground-engaging member and retaining it in yielding contact with the ground.

Other objects and advantages of the invention will be apparent during the course of the following description.

In the accompanyng drawings forming a part of this specification and in which like numerals are employed to designate like parts throughout the same:

Figure 1 is a side elevational view of a conventional type of automobile chassis equipped with an anti-skidding device constructed in accordance with this invention, showing said device in inoperative position.

Figure 2 is a view like Fig. 1 showing the device operative.

Figure 3 is a rear end elevational view of Fig. 1.

Figure 4 is a top plan view thereof with the rear wheel removed and the spring shown in dotted lines.

Figure 5 is a rear end elevational view of Fig. 2.

In carrying out the invention, I employ an attaching plate 1 which is clamped by U-bolts 2 to the rear axle housing adjacent one of the wheels. It is to be understood that there may be two of these anti-skid devices and each one positioned near one of the rear wheels. However, only a single one is shown. Proceeding, it is to be said that the numeral 3 designates a second plate which is designed for crosswise disposition on said attaching plate, being bolted or otherwise secured to the latter. A portion of the plate 3 extends beyond the remaining plate and carries a guide 4 which serves a purpose to be hereinafter set forth. It may be stated that this guide can be of any suitable construction. The opposite end of the plate 3 extends beyond the attaching plate and is directed downwardly as indicated at 5, the lower extremity thereof being rolled or bent upon itself to form a bearing 6, in which a pin 7 is rotatably mounted, the opposite ends of the latter extending beyond the corresponding ends of the bearing and having connected thereto, a section 8 of the extensible leg 9. This leg in addition to including the part 8, embodies a similar section 10 which is adjustably connected with the section 8 by means indicated at 11. A careful examination of the section 10 of the leg will disclose the fact that the lower end thereof is bifurcated forming a pair of spaced arms between which a ground engaging disk 12 is rotatable, the latter having its pintles journaled in bearing brackets 13 on the lower ends of said arms. With this construction and arrangement, it will be seen that by properly adjusting the sections 8 and 10 of the leg, the latter can be made to fit various sizes and makes of automobiles and can be adjusted closer to or further from the ground as desired. Attention is here directed to the fact that this leg and disk are normally suspended in the horizontal position indicated in Fig. 1, being held in such position by means of the pull-cable 14 which is connected with said leg and extends forwardly through the guide 4 to convenient position for operation by the driver. I may mention that the cable 14 can be associated at its forward end with any suitable means for holding it in various positions to which it has been moved, the means not being shown as it is immaterial as far as this invention is concerned.

It has been before indicated that the extensible leg and ground engaging disk which it carries are, when permitted to move to operative position, dropped downwardly by gravity until the disk comes into contact with the surface. With the construction shown, the leg is permitted to assume a true vertical position beneath the axle so that the weight of the car resting thereon will embed the disk slightly into the surface momentarily and prevent possible side swerving. This position of the leg is but for a short time because as the vehicle moves forwardly, the leg and disk will assume the rearwardly inclined position disclosed in Fig. 2, then permitting the disk to rest rather lightly on the surface, yet preventing further skidding until the dangerous place has been passed. It is desirable to limit the rearward swinging movement of the leg 9 and, as before indicated, I make use of novel means for accomplishing this end. The means, by preference, comprises a spring device carried by the leg and engageable with the depending portion 5 of the plate 3. Specifically described, this device comprises a bolt 15 slidable through an aperture in the vertically directed portion of an angular bracket 16 secured to the leg 9. On the outer end of this bolt is a nut 17 and surrounding the bolt between the vertically directed portion of the bracket 16 and head thereof, is a coil spring 18 which serves, as already stated, to hold the ground engaging disk in yielding contact with the ground and to limit the rearward movement of said disk and leg. It is possible that under certain conditions, the head of the bolt may possibly slip laterally and become disengaged from the plate 3. To prevent this, I make use of a combined stop and guide member 19 with which the headed end of the bolt is designed to coact as indicated more clearly in Fig. 2.

The device in addition to embodying the aforesaid parts, includes means to prevent possible rotation of the attaching plate and other parts about the rear axle housing. This means can be broadly spoken of as an anchor, the same being better shown in Fig. 4. Referring to this figure, it will be seen that this anchor is indicated by the numeral 20 and is bolted or otherwise secured to the outer end of the attaching plate 1, extending beyond this end and being engageable with the spring S. It may be engaged with the spring in any way. As shown, however, it is extended between the lowermost leaf of the spring and plate P of the usual spring-clip C. As the leaves of the springs are usually connected together by a bolt B, the outer end of the anchoring member is forked as indicated at 21 to straddle this bolt. With this construction, it will be seen that possible displacement of the device and rotation thereof around the axle housing H will be entirely overcome. Attention may be directed to the fact that other parts of the automobile chassis are shown but need not be referred to by reference characters as these other parts do not directly co-act with the anti-skid device.

Assuming that the leg and ground-engaging disk are in the horizontal suspended position shown in Fig. 1, it will be seen that by releasing the pull-cable 14, these parts will drop by gravity, bringing the disk into contact with the surface. Now, as the vehicle travels forwardly, the leg will assume a truly vertical position beneath the rear axle and at this time, the weight of the car will embed the periphery of the disk slightly in the surface, thus absolutely preventing any side swerving. As before stated, this condition of affairs is only momentary and the leg and disk quickly assume the rearwardly inclined position indicated in Fig. 2 to prevent further skidding. It is hardly necessary to again point out that the disk is held in yielding contact with the surface during the remainder of travel by means of the aforesaid spring device which contacts the plate 3. Then again, it may not be necessary to again call attention to the fact that the adjustability of the leg permits the device to be installed for effective use on various types of cars.

While I have shown and described my improved anti-skid device as being especially designed for use in connection with automobiles, I wish it to be understood that it could be equally well used on various other types of vehicles which need such devices.

Since probably the best results may be obtained with the construction and arrangement herein shown and described, it is taken as the preferred embodiment of the invention. However, slight minor changes coming within the scope of the subjoined claims may be resorted to.

I claim:

1. An anti-skid device of the class described comprising a road-engaging member, means for pivotally mounting the same on the chassis of an automobile, and a spring-pressed pin slidably connected to the upper part of said member and extending at right angles thereto and engaging the mounting means for limiting the movement of the member in one direction and for maintaining it in yielding contact with the road.

2. An anti-skid device for automobiles comprising a road-engaging member, means for pivotally mounting said member on the chassis of the automobile, an angular bracket secured to the upper end of said member, a pin slidably mounted on said bracket and engaging said mounting means, a spring surrounding said pin, and a stop on said mounting means with which the inner end of the pin co-operates.

3. The combination with an automobile chassis and spring, an attaching plate secured on the rear axle casing thereof, and a ground-engaging member pivotally connected with said attaching means; of a forked anchoring member carried by said attaching means, and extending beyond one end of the latter between the lowermost leaf of the spring and plate of the usual clip on the spring, whereby rotation of said attaching means on said axle will be prevented.

4. The combination with a vehicle chassis and spring; of an attaching plate secured on the rear axle casing, means carried thereby and engaging the adjacent spring to prevent rotation of the plate on said casing, a second plate crossing and secured intermediate its ends to said first named plate, a guide on the forward end of said second plate, a leg pivotally connected to the opposite end of said second plate, a ground-engaging element on the free end of said leg, a flexible pull-cable connected to the leg and passing forwardly through said guide, and co-acting means between the leg and said second named plate to limit the rearward movement of said leg.

5. The combination with a vehicle chassis; of a pivotally mounted leg, attaching means therefor on the chassis, a surface engaging element carried by said leg, an angular apertured bracket also carried by the leg, a bolt slidable through the aperture in said bracket, a nut on the threaded end of the bolt, the head of the bolt being engageable with said attaching means, a coil spring surrounding the bolt between the head thereof and said bracket, and a stop on said attaching means for co-action with said bolt head.

6. In a device of the class described, a plate extending transversely across and beyond the rear axle of an automobile, the forward end of said plate being directed upwardly and equipped with a guide, the opposite end thereof being directed downwardly, a ground-engaging member pivotally connected to the last mentioned end of said plate, an angular bracket carried by said ground-engaging member, a spring-pressed pin carried by said bracket, and a stop on the down bent end of said plate with which the adjacent end of said pin co-acts.

In testimony whereof I have hereunto set my hand.

WILLIAM McNAMES.